United States Patent Office 3,028,306
Patented Apr. 3, 1962

3,028,306
HYPERTENSIVE 2-AMINO - 3a,4,5,6,7,7a - HEXAHY-DROBENZOXAZOLE METHOD AND TOPICAL DOSAGE PREPARATION
George I. Poos, Ambler, and Adolph P. Roszkowski, Willow Grove, Pa., assignors to McNeil Laboratories, Incorporated, Philadelphia, Pa., a corporation of Pennsylvania
No Drawing. Filed June 17, 1959, Ser. No. 820,856
4 Claims. (Cl. 167—65)

The present invention relates to a novel composition possessing hypertensive activity and to a method of producing hypertensive action.

Phenylephrine has long been known to possess hypertensive properties, that is the ability to increase blood pressure. However, the duration of its effectiveness is inconveniently short.

It is the principal object of the present invention to provide novel medicinal compositions possessing hypertensive activity, that is the ability to increase blood pressure.

It is another object of this invention to provide hypertensive compositions of prolonged and long-lasting effectiveness.

These and other objects will become apparent upon consideration of the following specification and claims.

The novel composition of the present invention comprises a fused oxazoline dispersed in a pharmaceutical carrier therefor. The stated fused oxazoline will be a 2-amino-3a,4,5,6,7,7a-hexahydrobenzoxazole having the formula

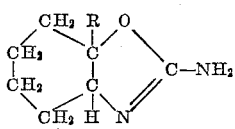

where R is selected from the group consisting of hydrogen and methyl.

The composition of the invention has been found to produce hypertensive effects of outstandingly prolonged duration. Administered in equipressor doses, compositions of this invention are effective for as long as four times that of phenylephrine. Topical, parenteral, or oral routes of administration can be used, as further discussed hereinafter.

The fused oxazoline employed in preparing the composition of this invention may include any one or more of those of the formula set forth hereinabove, namely 2-amino-3a,4,5,6,7,7a-hexahydrobenzoxazole (cis or trans) and 2 - amino-7a-methyl - 3a,4,5,6,7,7a - hexahydrobenzoxazole (cis or trans). For brevity these compounds will be referred to hereinafter as fused oxazolines, by which it is to be understood that any one or a mixture of the stated compounds, as well as of the optical isomers thereof, is intended.

The stated fused oxazolines possess basic properties enabling them to form salts with acids, and may be employed as the base or as salt. Since the salts generally possess greater solubility in water than do the bases, the compounds will desirably be prepared in the form of their salts for many applications. Such salts can readily be prepared by reaction between the fused oxazoline and an equivalent amount of the selected acid. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as the citrate, tartrate, malate, maleate, fumarate and picrate.

If a salt is to be administered, it will be pharmaceutically acceptable. Any toxicity or undersirable effects which may be imparted by the salt-forming acid will be taken into consideration in the selection of the salt, as is well known in the art. Pharmaceutically, a useful salt should not be substantially more toxic than the compound itself and should be able to be incorporated in the liquid or solid pharmaceutical media for preparation of therapeutically useful compositions. Such pharmaceutically useful salts are full equivalents of the bases from which they are derived for the present purposes, and are included herein and in the claims where reference is made to any fused oxazoline.

In preparing the composition of the present invention, the fused oxazoline will be combined with a significant amount of pharmaceutical carrier. The carrier may take any of a wide variety of forms depending on the form of the preparation desired for administration. Topical and parenteral administration are generally most conveniently accomplished using formulations including a liquid carrier. Sterile water constitutes a pharmaceutical carrier of choice in many applications. For parenteral administration, aqueous media will be included in compositions such as saline, glucose and saline-glucose solutions. An aqueous medium also may advantageously be employed for topical administration to mucous membranes such as nasal passages. Alternatively, compositions adapted for topical administration may comprise other customary liquid pharmaceutical carriers such as combinations of glycols, oils, alcohols, and the like. Hypertensive effects can also be produced by oral administration of the composition. Preparations intended for oral ingestion may be in the form of a solution, suspension, powder adapted for incorporation in liquid media, tablet, or capsule. In preparing the composition in oral dosage form any of the usual pharmaceutical carrier media may be employed, such as gelatin, in the case of capsules, combinations of water, glycols, oils, alcohols and the like in the case of solutions and suspensions; and starches, sugars, kaolin, salts, lubricants, binders and the like in the case of powders and tablets. Tablets represent the most advantageous oral dosage form. Additional pharmaceutically acceptable ingredients such as bacteriostatic agents and the like may also be present in any of the selected forms of the compositions of the invention. The complete carrier, of course, will be pharmaceutically acceptable and should not impart toxicity or any other undesirable side effects.

The amount of the composition administered to produce hypertensive effects and the concentration of the fused oxazoline in the composition will vary depending on several factors, including particularly the method of administration. In typical form designed for topical administration, a relatively low concentration of the fused oxazoline, on the order of about 0.50%, by weight, will be preferred. In such compositions the concentration of fused oxazoline may range as low as 0.1% or may alternatively be very much higher, including concentrations up to about 10%. Where the compositions are to be administered internally, such as parenterally, the dosage will generally require to be proportioned to the body weight. In such case, the amount of composition administered per dose may range from that providing as little as about 0.1 milligram of the fused oxazoline per kilogram of body weight to that providing as high as about 10 mg. per kg. A relatively high dosage of the present composition can be administered while remaining safely below a toxic dose. To obtain equipressor levels, the amount of the fused oxazoline used will be about twenty times the dosage of phenylephrine, the administration of the fused oxazoline-containing composition at such levels producing a substantially more prolonged action in maintaining the pressure level than is exhibited by the dosage of phenylephrine. In a composition to be administered internally, the concentration of the fused oxazoline generally will be at least about 0.2% by weight and preferably at least about 0.5%. The concentration of the fused oxazoline may range much higher than these figures depending on the form that the composition takes, and in some cases the concentration of the compounds may go as high as about 60–70%. Generally the composition per dosage unit will contain at least about 5 mg. of the fused oxazoline and in some cases the amount per dosage unit may reach as high as about 250 mg.

The preparation of the presently provided compositions will be accomplished by combining the selected fused oxazoline with a pharmaceutical carrier to prepare the composition for administration, such combination of the stated ingredients being carried out by procedures conventional in the pharmaceutical art such as tableting, suspending or dispersing the compound in a liquid carrier or dissolving it therein, or the like.

Methods by which the fused oxazolines may be prepared, such as cyclization of an iodocyclohexylurea, are set forth in the following examples. Where the fused oxazolines are insufficiently soluble in aqueous media for the intended application, the preparation thereof may include conversion to pharmaceutically acceptable salts, which is simply accomplished as exemplified by the illustrative procedures of the examples.

The present invention will be more readily understood from a consideration of the following examples which are given for the purpose of illustration only and are not intended to limit the scope of the invention in any way.

GROUP I EXAMPLES

These examples illustrate the preparation of the fused oxazoline of the formula shown hereinabove where R is H and salts thereof. The procedure to be used varies depending on whether this cis or trans form of the fused oxazoline is to be prepared.

I–A

This example illustrates the preparation of cis-2-amino-3a,4,5,6,7,7a-hexahydrobenzoxazole in base and salt form.

The starting material for this synthesis, trans-2-iodocyclohexylurea, is prepared as follows: Cyclohexene (38.3 g., 0.466 mole) is added to a suspension of 70 g. (0.466 mole) of thoroughly dried silver cyanate in ether. A solution of iodine in ether is prepared by adding 125 g. of iodine to 700 cubic centimeters (cc.) of ether. Five hundred cc. of this iodine solution are added dropwise with stirring to the cyclohexene solution. At this point the reaction mixture is dark iodine-colored. The mixture is then stirred for 2 hours, and filtered to remove silver iodide. The filtrate is a solution of 2-iodocyclohexylisocyanate. Ammonia is bubbled into this filtrate slowly, with stirring, for 20 minutes. A yellow solid comprising trans-2-iodocyclohexylurea is formed. This solid is filtered off, washed 3 times with ether, twice with ethanol and once with ethanol containing a very small amount of sodium sulfite. The solid obtained weighs 59.9 g. Recrystallization of a 15 g. portion of this solid from 1.5 liters of ethanol containing a trace of sodium sulfite yields 7.24 g. of purified trans-2-iodocyclohexylurea, M. 151–152° C.

To prepare the aminohexahydrobenzoxazole, 48 g. of trans-2-iodocyclohexylurea prepared as described above is boiled for 5 hours in 675 cc. of water. Insoluble material is removed by filtration, and then the filtrate is concentrated under vacuum to about 250 cc. The solution is now made alkaline by addition of a solution of 35 g. of sodium hydroxide dissolved in a minimum amount of water, while the reaction mixture is cooled and swirled. The resulting basic solution is extracted 5 times with methylene chloride and the methylene chloride extracts are washed, dried and concentrated. There is thereby obtained a yield of 20.1 g. (80% of theory) of cis-2-amino-3a,4,5,6,7,7a-hexahydrobenzoxazole, as a light brown viscous oil which crystallizes slowly on standing to a low melting solid.

I–B

To prepare the fumarate salt of this hexahydrobenzoxazole, a methanolic solution of 3.25 g. (0.0357 mole) of fumaric acid is added to a solution of 10 g. (0.0714 mole) of the product of the foregoing procedure, in methanol. On cooling and filtering, 9.7 g. of solid is obtained. This product is recrystallized from methanol to produce 8.72 g. of cis-2-amino-3a,4,5,6,7,7a-hexahydrobenzoxazole fumarate, M. 211.5–212° C. (decomp.). The calculated nitrogen analysis of $C_{18}H_{28}N_4O_6$ is N, 14.13; that found is N, 14.13, 13.74. The infrared spectrum shows

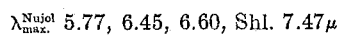

I–C

The following procedure can be used to prepare trans-2-amino-3a,4,5,6,7,7a-hexahydrobenzoxazole and its salts.

Cyanogen bromide is prepared by adding a solution of 4.45 g. (0.0907 mole) of sodium cyanide in methanol to a methanolic solution of 14.5 g. (0.0907 mole) of bromine at 0° C. To this solution is added a solution of 9.5 g. (0.082 mole) of trans-2-aminocyclohexanol in methanol, and the mixture is stirred for 10 minutes with ice bath cooling, after which the ice bath is removed and stirring of the reaction mixture is continued at room temperature for an additional one and a half hours.

Ammonia is added to bring the solution to pH 10 and then the solution is concentrated under vacuum to remove the methanol. A concentrated sodium hydroxide solution is added to make the reaction mixture strongly basic. Then the solution is extracted 5 times with methylene chloride. After washing, drying, filtering and concentrating the methylene chloride extract, 7.96 g. of trans-2-amino-3a,4,5,6,7,7a-hexahydrobenzoxazole, as a white solid, is obtained. An additional 1.11 g. of this material can be extracted from the aqueous phase by making it more basic with sodium hydroxide and extracting it 3 times more with methylene chloride. The total crude yield of the trans-2-amino-3a,4,5,6,7,7a-hexahydrobenzoxazole is thereby increased to 9.07 g.

Because this compound tends to hydrolze in aqueous solution, it is generally prepared as a salt for use in such an environment.

I–D

To convert trans-2-amino-3a,4,5,6,7,7a-hexahydrobenzoxazole to a salt thereof, the material is dissolved in methanol and filtered. To the filtrate is added a methanolic solution of 2.63 g. (0.0227 mole) of fumaric acid. The white solid which forms is separated by filtration, washed with a mixture of methanol and ether, and dried. There is thereby obtained 7.74 g. of the normal fumarate of trans - 2 - amino-3a,4,5,6,7,7a-hexahydrobenzoxazole, M. 214–216° C. (decomp). The calculated analysis for $C_{18}H_{28}N_4O_6$ is C, 54.53; H, 7.12; N, 14.13. That found is C, 54.20; H, 7.19; N, 14.38. The infrared spectrum of this product shows

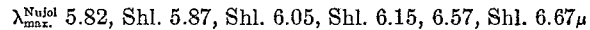

GROUP II EXAMPLES

These examples illustrate the preparation of the methyl-substituted derivatives of the fused oxazoline.

II–A

This example illustrates the preparation of cis-2-amino-7a-methyl-3a,4,5,6,7,7a-hexahydrobenzoxazole.

To prepare the appropriate iodourea starting material, 9.6 g. (0.1 mole) of 1-methyl-1-cyclohexene is reacted with 15.7 g. (0.105 mole) of silver cyanate and 25.4 g. (0.1 mole) of iodine, and the resulting reaction product is then treated with anhydrous ammonia substantially as described in the first paragraph of Example I-A. The ether solution is then evaporated and the residue taken up in chloroform and filtered. The chloroform filtrate is evaporated to yield a residue which is taken up again in chloroform. The resulting solution is extracted with 0.5 N hydrochloric acid. The acid layer is separated, cooled, made basic with sodium hydroxide and extracted with methylene chloride. The resulting methylene chloride solution is evaporated to produce 10 g. of oily residue. This crude product is recrystallized 3 times from cyclohexane and once from ether, to give white crystals of cis - 2-amino-7a-methyl-3a,4,5,6,7,7a-hexahydrobenzoxazole, M. 123–125° C. The calculated nitrogen analysis of $C_8H_{14}N_2O$ is N, 18.18; that found is N, 18.06, 18.26. The infrared spectrum shows $$\lambda_{max.}^{Nujol} \ 2.92, \ 5.88, \ 6.22, \ 6.95\mu$$

This compound has been designated the 7a-methyl derivative, as distinguished from the 3a-methyl derivative, based on theoretical considerations, and it is believed that cis - 2-amino-3a-methyl-3a,4,5,6,7,7a-hexahydrobenzoxazole, if formed at all, is present only in a small amount.

II-B

Using the procedure set forth in Example I-B this compound is converted to its fumarate salt.

GROUP III EXAMPLES

These examples illustrate formulas for preparing a composition in accordance with the invention for administration as a pharmaceutical.

III-A

To produce a solution adapted for topical application to mucous membrane, the following formula may be followed:

|  | Percent w./v. |
| --- | --- |
| Cis - 2 - amino-3a,4,5,6,7,7a-hexahydrobenzoxazole fumarate | 0.5 |
| Phenylmercuric acetate | 0.002 |
| Cetyl dimethylbenzylammonium chloride | 0.025 |
| Sodium phosphate dibasium (to adjust pH to 6.3–6.9). | |
| Distilled water (q.s.). | |

III-B

To prepare 8000 tablets each containing 50 mg. of the fused oxazoline, preparation of which is described in Example I-C, the following formula may be used:

|  | G. |
| --- | --- |
| Trans - 2 - amino-3a,4,5,6,7,7a-hexahydrobenzoxazole fumarate | 400 |
| Milk sugar | 800 |
| Dibasic calcium phosphate U.S.P. | 1527.2 |
| Starch (filler and disintegrating agent) | 799.3 |
| Calcium stearate | 56.7 |
| Gelatin solution (1.5 pounds per gallon) | 400 |

In place of the milk sugar, dibasic calcium phosphate and the portion of the starch making up the filler, there may be used sucrose, polyethylene glycol 4000, mannitol and/or calcium carbonate in various combinations and proportions. Starch paste, acacia solution, glucose solution, carboxymethylcellulose solution, shellac, or the like, may be used in place of gelatin solution as granulating agent. Calcium stearate is employed as a lubricating agent and may be replaced by magnesium stearate, stearic acid, talc, or the like.

III-C

The following formula illustrates the preparation of 1000 #3 capsules each containing 100 mg. of the cis-2-amino-7a-methyl-3a,4,5,6,7,7a-hexahydrobenzoxazole:

|  |  |
| --- | --- |
| Cis-2-amino-7a-methyl-3a,4,5,6,7,7a-hexahydrobenzoxazole | g-- 100 |
| Milk sugar | g-- 150 |
| Fill weight | mg-- 250 |

In place of or in addition to the milk sugar may be used sucrose, dicalcium phosphate, calcium carbonate, kaolin, mannitol and/or starch and the like.

To measure its comparative effectiveness, a composition as provided by this invention was administered in parallel tests with phenylephrine. A dose of 5 mg. per kg. of trans-2-amino-3a,4,5,6,7,7a-hexahydrobenzoxazole, for example, administered intravenously, produces an average of 206% above control blood pressure in the test species. Fifty percent recovery occurs in from 10 to 88 minutes. The duration of maintenance of the elevated blood pressure (based on 50% return to normal) obtained with phenylephrine, administered in equipressor doses, is only one-quarter of this. A dose of 1 mg. per kg. of cis-2 - amino-7a-methyl-3a,4,5,6,7,7a-hexahydrobenzoxazole hydrochloride (2% solution in sterile water), administered intravenously, produces an average of 129% above control blood pressure in the test species. Seventy percent recovery occurs in about five minutes.

Modification is possible in the selection of the particular form of the fused oxazoline selected as well as in the pharmaceutical form of the composition employed and the means of administration without departing from the scope of the invention.

What is claimed is:

1. A pharmaceutical preparation in dosage unit form adapted for topical application to mucous membrane comprising, in sterile distilled water, between about 5 mg. and about 250 mg. per dosage unit of a pharmaceutically acceptable water-soluble salt of a 2-amino-3a,4,5,6,7,7a-hexahydrobenzoxazole of the formula where R is selected from the group consisting of hydrogen and methyl.

2. The product of claim 1 wherein said salt is the fumarate.

3. The method of producing hypertensive action which comprises administering a 2-amino-3a,4,5,6,7,7a-hexahydrobenzoxazole of the formula where R is selected from the group consisting of hydrogen and methyl.

4. The method of claim 3 wherein said 2-amino-3a,4,5,6,7,7a-hexahydrobenzoxazole is applied topically to mucous membrane.

References Cited in the file of this patent

Birckenbach et al.: "Ber" 66 B, pp. 1571–7 (1933).
Domino et al.: J. Pharmacol. Exptl. Therapy, vol. 105, pp. 486–97 (1952).